(12) United States Patent
Zhou et al.

(10) Patent No.: US 11,593,680 B2
(45) Date of Patent: Feb. 28, 2023

(54) PREDICTIVE MODELS HAVING DECOMPOSABLE HIERARCHICAL LAYERS CONFIGURED TO GENERATE INTERPRETABLE RESULTS

(71) Applicant: INTERNATIONAL BUSINESS MACHINES CORPORATION, Armonk, NY (US)

(72) Inventors: Nianjun Zhou, Yorktown Heights, NY (US); Wesley M. Gifford, Ridgefield, CT (US); Ta-Hsin Li, Danbury, CT (US); Pietro Mazzoleni, New York, NY (US); Pavankumar Murali, Ardsley, NY (US)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 16/928,171

(22) Filed: Jul. 14, 2020

(65) Prior Publication Data

US 2022/0019911 A1 Jan. 20, 2022

(51) Int. Cl.
*G06Q 30/00* (2012.01)
*G06N 5/04* (2006.01)
*G06N 20/00* (2019.01)

(52) U.S. Cl.
CPC .............. *G06N 5/04* (2013.01); *G06N 20/00* (2019.01)

(58) Field of Classification Search
None
See application file for complete search history.

(56) References Cited

U.S. PATENT DOCUMENTS 7,318,051 B2   1/2008   Weston et al.
7,558,766 B1   7/2009   Forman
(Continued)

FOREIGN PATENT DOCUMENTS

CN   106557451 A   4/2017
CN   109002810 A   12/2018
(Continued)

OTHER PUBLICATIONS

Ba et al., "Do Deep Nets Really Need to be Deep?" arXiv:1312.6184v7 [cs.LG] Oct. 11, 2014, pp. 1-10.
(Continued)

*Primary Examiner* — Matthew T Sittner
(74) *Attorney, Agent, or Firm* — Cantor Colburn LLP; Joseph Petrokaitis

(57) ABSTRACT

A computer-implemented method for providing interpretable predictions from a machine learning model includes receiving a data structure that represents a hierarchical structure of a set of features (X) used by one or more predictive models to generate a set of predictions (Y). An interpretability model is built corresponding to the predictive models, by assigning an interpretability to each prediction $Y_i$ based on the hierarchical structure. Assigning the interpretability includes decomposing X into a plurality of partitions $X_j$ using the hierarchical structure, wherein $X = U_1^N X_j$, N being the number of partitions. Further, each partition is decomposed into a plurality of sub-partitions using the hierarchical structure until atomic sub-partitions are obtained. A score is computed for each partition as a function of the predicted scores of the sub-partitions, wherein the predicted scores represent interactions between the sub-partitions. Further, an interpretation of a prediction is outputted.

18 Claims, 12 Drawing Sheets

(56) References Cited

U.S. PATENT DOCUMENTS

| | | |
|---|---|---|
| 7,958,066 B2 | 6/2011 | Pinckney et al. |
| 8,019,593 B2 | 9/2011 | Weng et al. |
| 8,301,638 B2 | 10/2012 | Xu et al. |
| 8,374,974 B2 | 2/2013 | Chen et al. |
| 8,521,631 B2 | 8/2013 | Abrahams et al. |
| 8,738,421 B1 | 5/2014 | Ali |
| 9,378,466 B2 | 6/2016 | Kumar et al. |
| 9,836,455 B2 | 12/2017 | Martens et al. |
| 10,102,480 B2 | 10/2018 | Dirac et al. |
| 2002/0159642 A1 | 10/2002 | Whitney |
| 2007/0260566 A1 | 11/2007 | Urmanov et al. |
| 2008/0004904 A1 | 1/2008 | Tran |
| 2009/0287621 A1 | 11/2009 | Krupka et al. |
| 2011/0106735 A1 | 5/2011 | Weston et al. |
| 2014/0229164 A1 | 8/2014 | Martens et al. |
| 2016/0026917 A1 | 1/2016 | Weisberg et al. |
| 2018/0158552 A1 | 6/2018 | Liu et al. |
| 2019/0110753 A1 | 4/2019 | Zhang et al. |
| 2020/0388358 A1 | 12/2020 | Chen et al. |
| 2021/0027116 A1* | 1/2021 | Monaghan ............ G06K 9/6262 |

FOREIGN PATENT DOCUMENTS

| | | | |
|---|---|---|---|
| CN | 111066033 A | 4/2020 | |
| CN | 111353603 A * | 6/2020 | ............ G06N 20/10 |
| CN | 111353603 A | 6/2020 | |
| EP | 3564862 A1 | 11/2019 | |
| KR | 101818074 B1 | 1/2018 | |
| WO | 2012009724 A1 | 1/2012 | |
| WO | 2012107786 A1 | 8/2012 | |
| WO | 2017144085 A1 | 8/2017 | |
| WO | 2019045758 A1 | 3/2019 | |

OTHER PUBLICATIONS

De Gonzalez et al., "Interpretation of Interaction: A Review," The Annals of Applied Statistics, vol. 1, No. 2, pp. 371-385. 2007. DOI: 10:1214/07-AOAS124.

Papernot et al., "Semi-supervised Knowledge Transfer for Deep Learning from Private Training Data," 5th International Conference on Learning Representations (ICLR), Apr. 24-26, 2017. 16 pages.

International Search Report and Written Opinion; dated Sep. 28, 2021; Application No. PCT/CN2021/104054 Filed: Jul. 1, 2021; 10 pages.

* cited by examiner

Step 1: Partition the input data according to the hierarchical structure

Step 2: Build predictive models for each partition $Y_\_$ is the TRUE target (or outcome) for partition-Y, assign $Y \leftarrow Y_\_$ Feature set $X \in \{x_1, x_2, ..., x_K\}$ for $i \in [1, k]$, $k$ is the total number of selected features in partition-Y Build a predictive model $[\{X\},\{Y\}]$ with predicted outcome $Y_0$ for partition-Y Step 3: Assign the interpretability to the predictive models Select Target: $Y \leftarrow Y_0$ Decomposition Loop (Initiate a tree walk through the hierarchical structure)

Decompose $X = \cup_1^N X_j$

The input is the selected feature sets, the features are partitioned into mutual exclusive subsets. $X_j$ is the set of features for expert $j$. With $Y_1$ as outcome Build the interpretable model using the expert partitions and the selected target Select next level decomposition for next expert $X_j$, assign $X \leftarrow X_j$ and $Y \leftarrow Y_{1j}$ (here $Y_{1j}$ is the score or option of the Expert $X_j$ at this level).

End Decomposition Loop (end tree loop)

FIG. 10

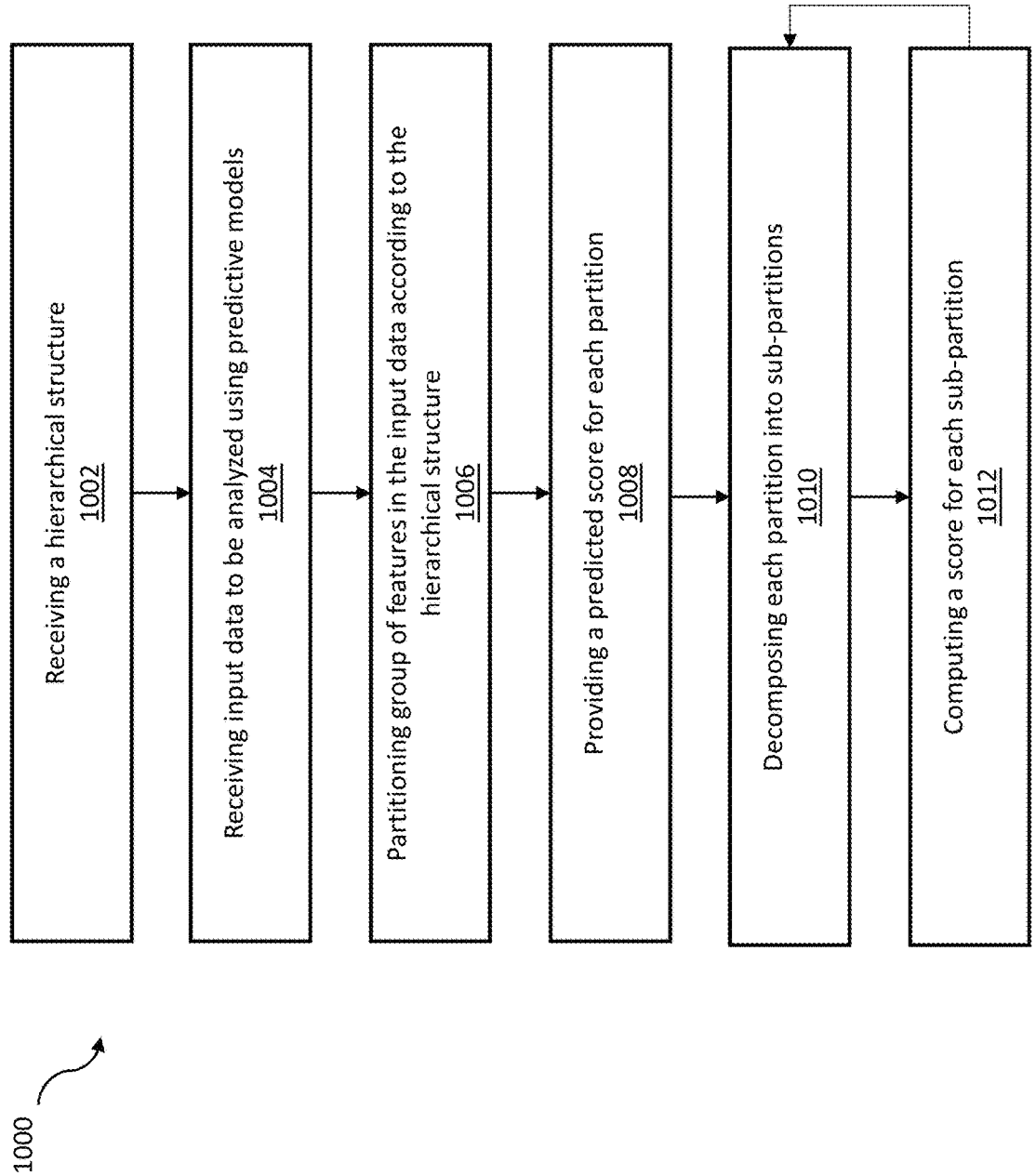

PREDICTIVE MODELS HAVING DECOMPOSABLE HIERARCHICAL LAYERS CONFIGURED TO GENERATE INTERPRETABLE RESULTS

BACKGROUND

The instant disclosure generally relates to programmable computers and, more specifically, relates to programmable computer systems configured to generate and run a set of predictive models that use decomposable hierarchical structures of utilized features grouped into different granularities to generate results that are more easily interpreted.

Many fields, such as the medical field, attempt to incorporate the use of predictive machine learning models to perform tasks that require the analysis of data, and that further requires using the results of that analysis as the basis of future actions. In general, predictive machine learning models are generated by and run on neural networks or other machine learning algorithms, which can be implemented as programmable computers configured to run a set of machine learning algorithms. Neural networks incorporate knowledge from a variety of disciplines, including neurophysiology, cognitive science/psychology, physics (statistical mechanics), control theory, computer science, artificial intelligence, statistics/mathematics, pattern recognition, computer vision, parallel processing and hardware (e.g., digital/analog/VLSI/optical).

The basic function of neural networks and other machine learning algorithms is to recognize patterns by interpreting unstructured data through a kind of machine perception. Unstructured real-world data in its native form (e.g., images, sound, text, or time series data) is converted to a numerical form (e.g., a vector having magnitude and direction) that can be understood and manipulated by a computer. The machine learning algorithm performs multiple iterations of learning-based analysis on the real-world data vectors until patterns (or relationships) contained in the real-world data vectors are uncovered and learned. The learned patterns/relationships function as predictive models that can be used to perform a variety of tasks, including, for example, predictions of real-world data. Prediction tasks often depend on the use of labeled datasets to train the neural network (i.e., the model) or other machine learning models to recognize the correlation between labels and data. This is known as supervised learning.

While simple prediction models can be self-explanatory using the generic linear models or decision tree models, machine learning model results generated for more complicated tasks can be challenging to understand for a more complex model structure. The machine learning models developed to perform complicated tasks (e.g., sentiment analysis of on-line posts) are often "black-box" models in that the relationship between the task assigned to the model and the results generated by the model is not clear. But as tasks become more complex, the relationship between the model's results and the task the model was designed to perform can be unclear.

SUMMARY

A computer-implemented method for providing interpretable predictions from a machine learning model includes receiving a data structure that represents a hierarchical structure of a set of features (X) used by one or more predictive models to generate a set of predictions (Y). The method includes building an interpretability model corresponding to the predictive models, by assigning an interpretability to each prediction $Y_i$ of the predictive model based on the hierarchical structure. Assigning the interpretability includes decomposing the set of features (X) of the input data into a plurality of partitions $X_j$ using the hierarchical structure, wherein $X = U_1^N X_j$, N being the number of partitions. Further, each partition is decomposed into a plurality of sub-partitions using the hierarchical structure until atomic sub-partitions are obtained. A score is computed for each partition as a function of the predicted scores of the sub-partitions, wherein the predicted scores represent interactions between the sub-partitions. Further, an interpretation of a prediction provided by the predictive model based on the interpretability model is outputted. The interpretation represents a weightage of the one or more features used by the predictive model to generate the prediction.

Other embodiments of the present disclosure implement features of the above-described method in computer systems and computer program products.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the disclosure are apparent from the following detailed description taken in conjunction with the accompanying drawings in which:

FIG. 10 depicts an illustrative example of pseudo code for an algorithm for adding interpretability with decomposable hierarchical structures in accordance with one or more embodiments of the invention;

FIG. 11 depicts a flow diagram of a method for providing interpretability for predictive models using decomposable hierarchical structures in accordance with one or more embodiments of the invention.

Figure 1:
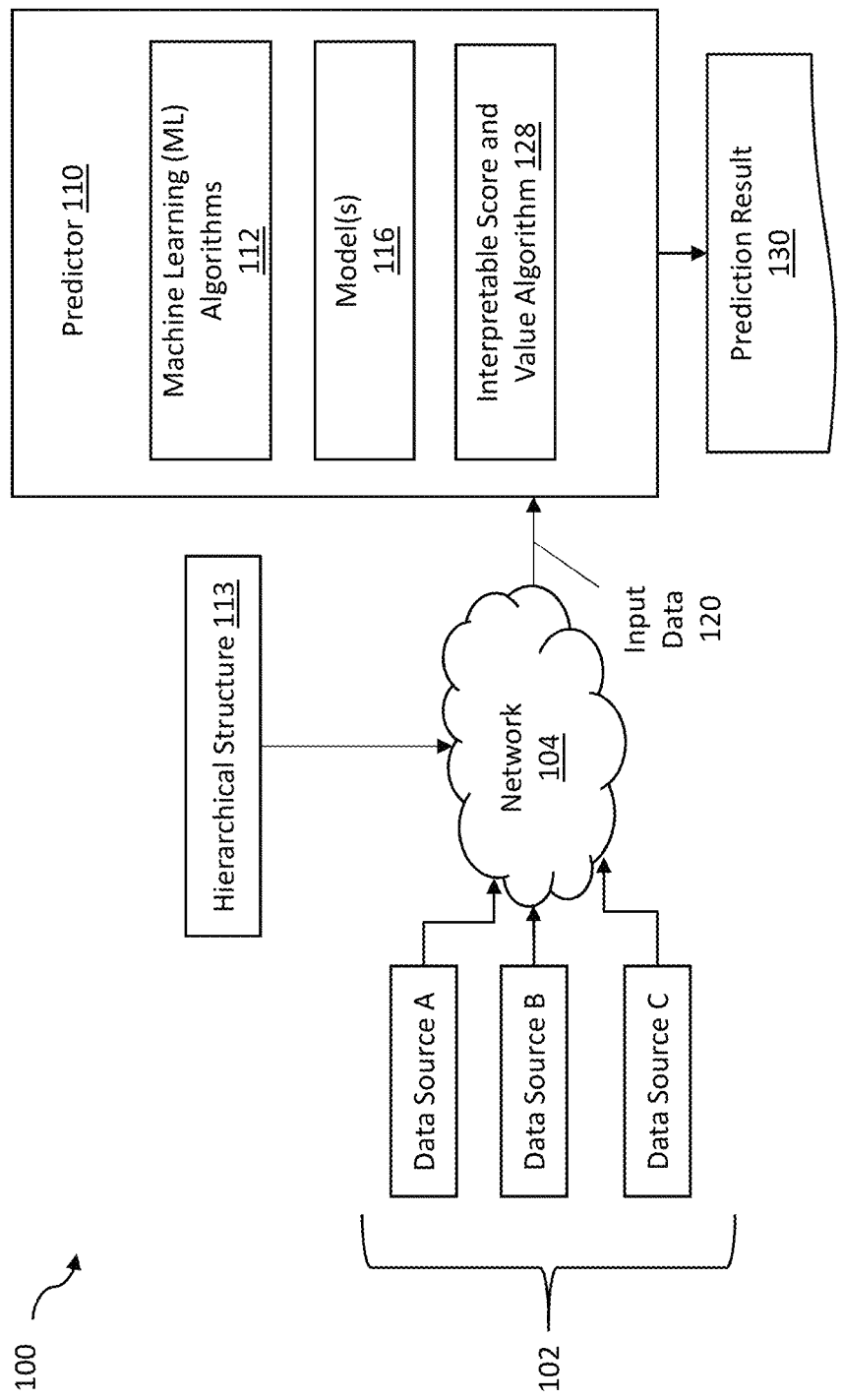
FIG. 1 depicts a machine learning system that can be utilized to implement aspects of the invention.

The diagrams depicted herein are illustrative. There can be many variations to the diagrams, or the operations described therein, without departing from the spirit of the disclosure. For instance, the actions can be performed in a differing order or actions can be added, deleted or modified. Also, the term "coupled", and variations thereof describes having a communications path between two elements and does not imply a direct connection between the elements with no intervening elements/connections between them. All of these variations are considered a part of the specification.

DETAILED DESCRIPTION

The present disclosure is generally directed to systems and methods for predictive models having decomposable hierarchical layers configured to generate interpretable results. The systems and methods described herein are directed to providing interpretable results along with results from machine learning models, which can be easily understood by users, such as decision-makers in professional fields. The system can generate interpreted results from an input data set produced by machine learning models. The interpreted results provide context, such as identifying the factors that influenced a particular prediction and presented the context and results of the machine learning models in a clear and easily understood manner. The system utilizes a decomposable approach to add the interpretability to each key factor of the results produced by the machine learning models. The interpreted results can be viewed at different levels of granularity, allowing a user to zoom in to a more granular level of the results provided with contextual reasoning and rationale.

Embodiments of the present disclosure are directed to providing interpretability for predictive models using decomposable hierarchical structures and attention neural networks. A non-limiting example computer-implemented method includes using a hierarchical structure that is created by one or more experts for generating multiple predictive models for each layer of the hierarchical structure. Each layer of the hierarchical structure includes a subset of features, where a root layer includes all of the features considered by the hierarchical structure. Each predictive model can use an attention neural network for predicting an output using the features from the corresponding layer. In one or more embodiments of the present invention, each layer is further partitioned into groups of features, and each partition is used to train a respective predictive model. By training such multiple predictive models from each layer, a final predicted output is generated using a score or value that is assigned to each partition.

One or more embodiments of the present invention include a computer implemented method that includes partitioning an input data according to the hierarchical structure. Further, the method includes providing a predicted score or value for each partition. The method can further include decomposing each partition into sub-partitions using the hierarchical structure. Further, the method includes providing a new predicted score or value for each sub-partition. The scores can be computed by using attention neural network models. Further, the method includes providing the interpretability of a prediction provided based on the input data using the contribution of features (i.e. a feature partition) to the overall score or value of predictive models. The interpretability is determined as the interaction of scores or values of a partition and its sub-partitions.

Embodiments of the present invention include systems, computer program products, and other types of implementations. Accordingly, one or more embodiments of the present invention described herein are directed to providing interpretable results along with results generated by attention neural network models to provide context and clarity. By providing results that are more accessible and understandable than results generated by machine learning models, users are able to execute actions for the identified situation based on a clearer understanding of the results generated by the machine learning models.

In aspects of the invention, the system can be configured to receive industry data (such as best practices, identification of attributes and features, relationships between features, and the like) from industry knowledge professionals (e.g., skilled users from an identified field). In aspects of the invention, the system uses the industry data to construct a hierarchical structure, which can be used by an interpretability model of the system to add interpretability to results generated by machine learning models.

In some examples, industry knowledge professionals may identify and label a set of features and/or attributes as an "partition." Partitions can also be developed using machine learning models by processing historical data. In aspects of the invention, the partition is configured as a set of closely related features. For example, in the medical field, an partition of patients may include features and/or attributes such as symptoms, medical history, age, gender, phone number, address, and the like. In some examples, an additive model may be used to represent contributions from each partition, culminating in the entire set of features being represented by the hierarchical structure.

The systems and methods described herein can use a decomposable approach to add a layer of interpretability to results generated by machine learning models. In aspects of the invention, the decomposable approach enables users to zoom into specific partitions of data based on the results, which are provided with the reasoning and rationale provided by the hierarchical structure. Users develop future actions based on a clearer understanding of the results, which can be interpreted according to the interpretation data provided using the hierarchical structure.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the functional units described in this specification have been labeled as modules. Embodiments of the present invention apply to a wide variety of module implementations. For example, a module can be implemented as a hardware circuit configured to include custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. A module can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together but can include disparate instructions stored in different locations which, when joined logically together, include the module and achieve the stated purpose for the module.

Figure 6:
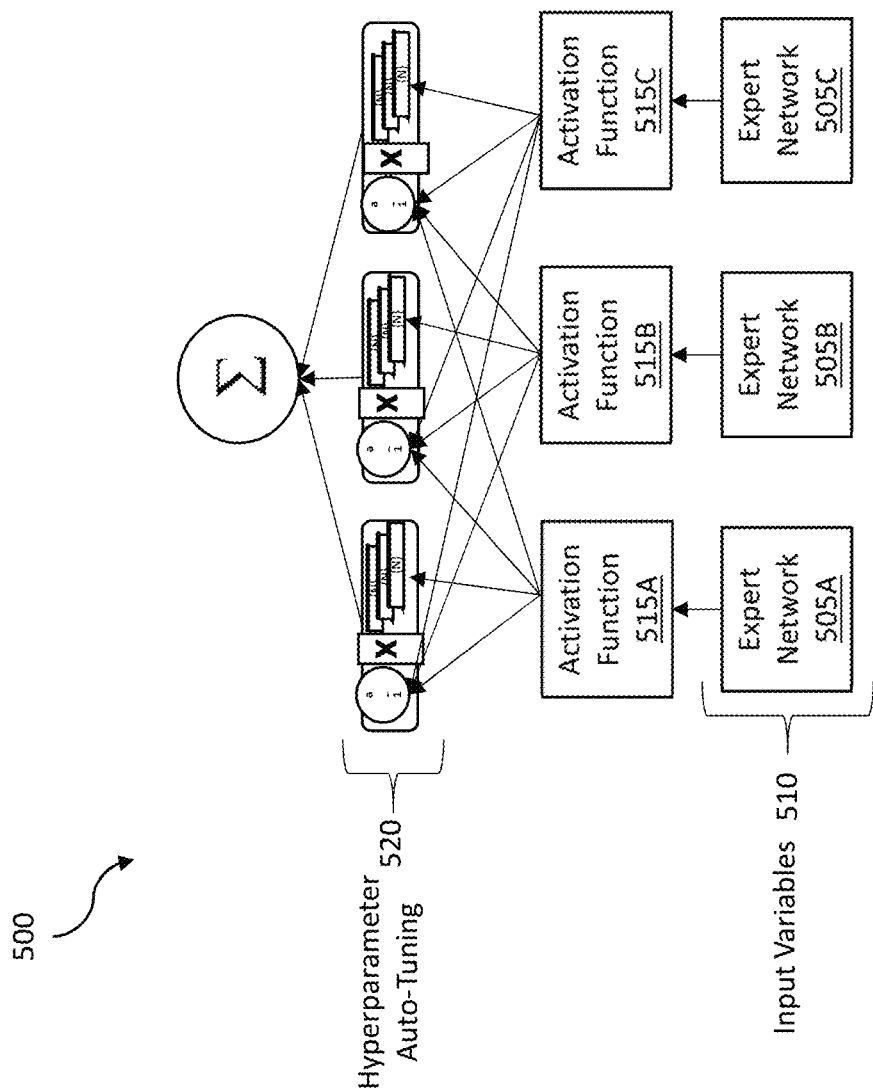
FIG. 6 depicts an illustration of an example of an attention model used to train predictions at a given granularity in accordance with one or more embodiments of the invention.
Figure 7:
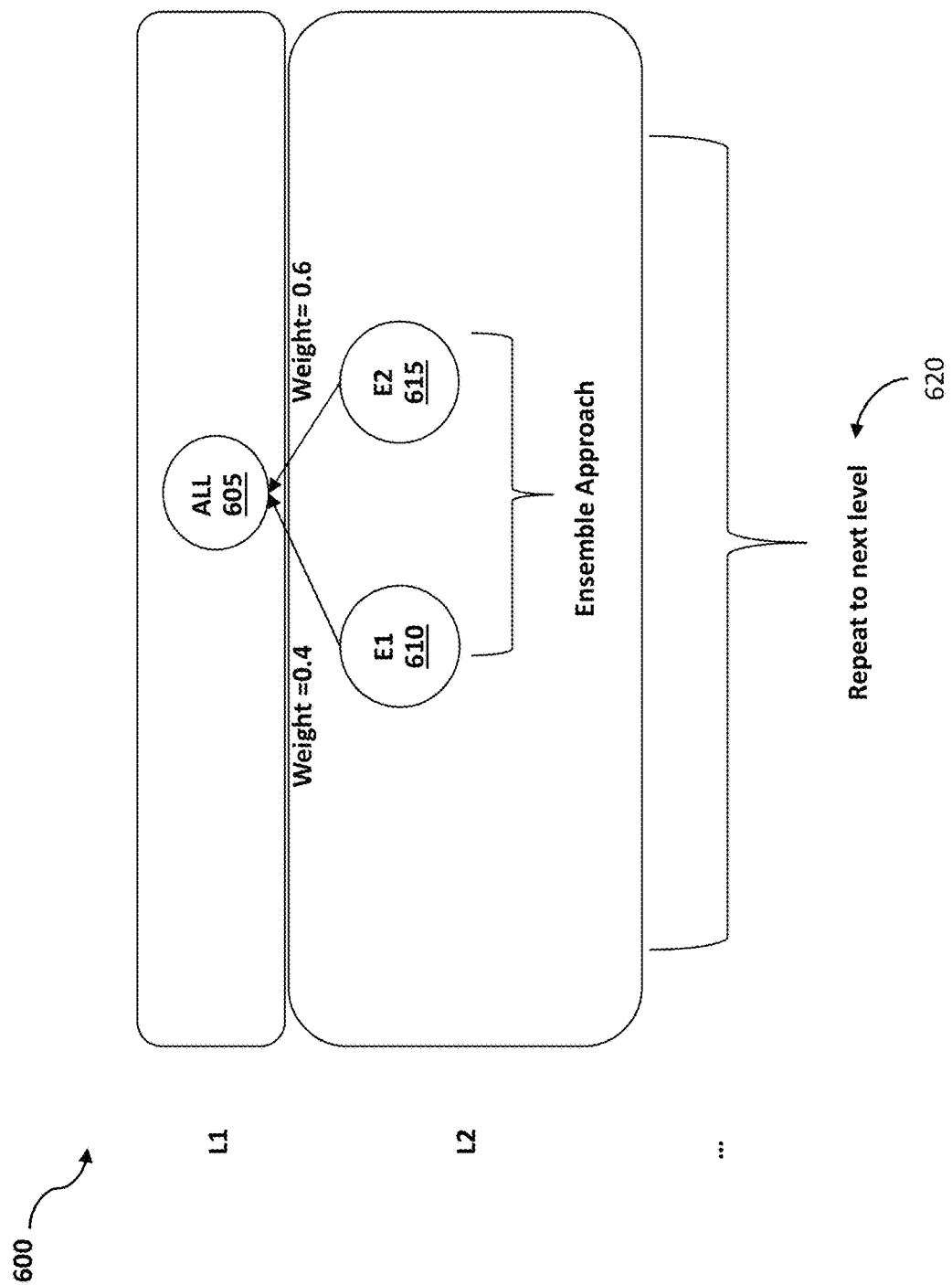
FIG. 7 depicts an illustrative example of training models using a hierarchical structure in accordance with one or more embodiments of the invention.
Figure 8:
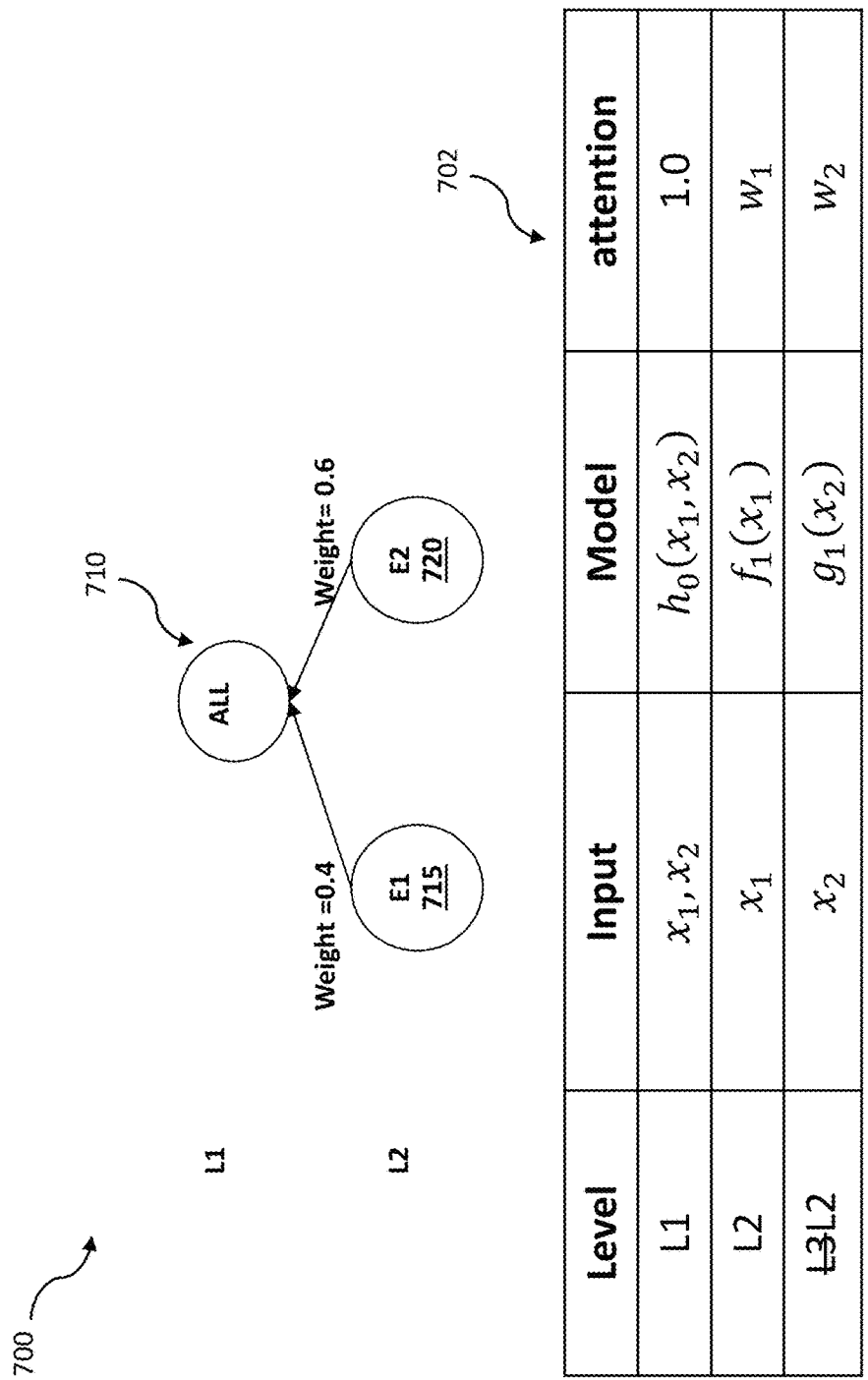
FIG. 8 depicts an illustrative example of quantifying the interaction of factors based on the difference on the course level of prediction with immediate next level of prediction in accordance with one or more embodiments of the invention.
Figure 9:
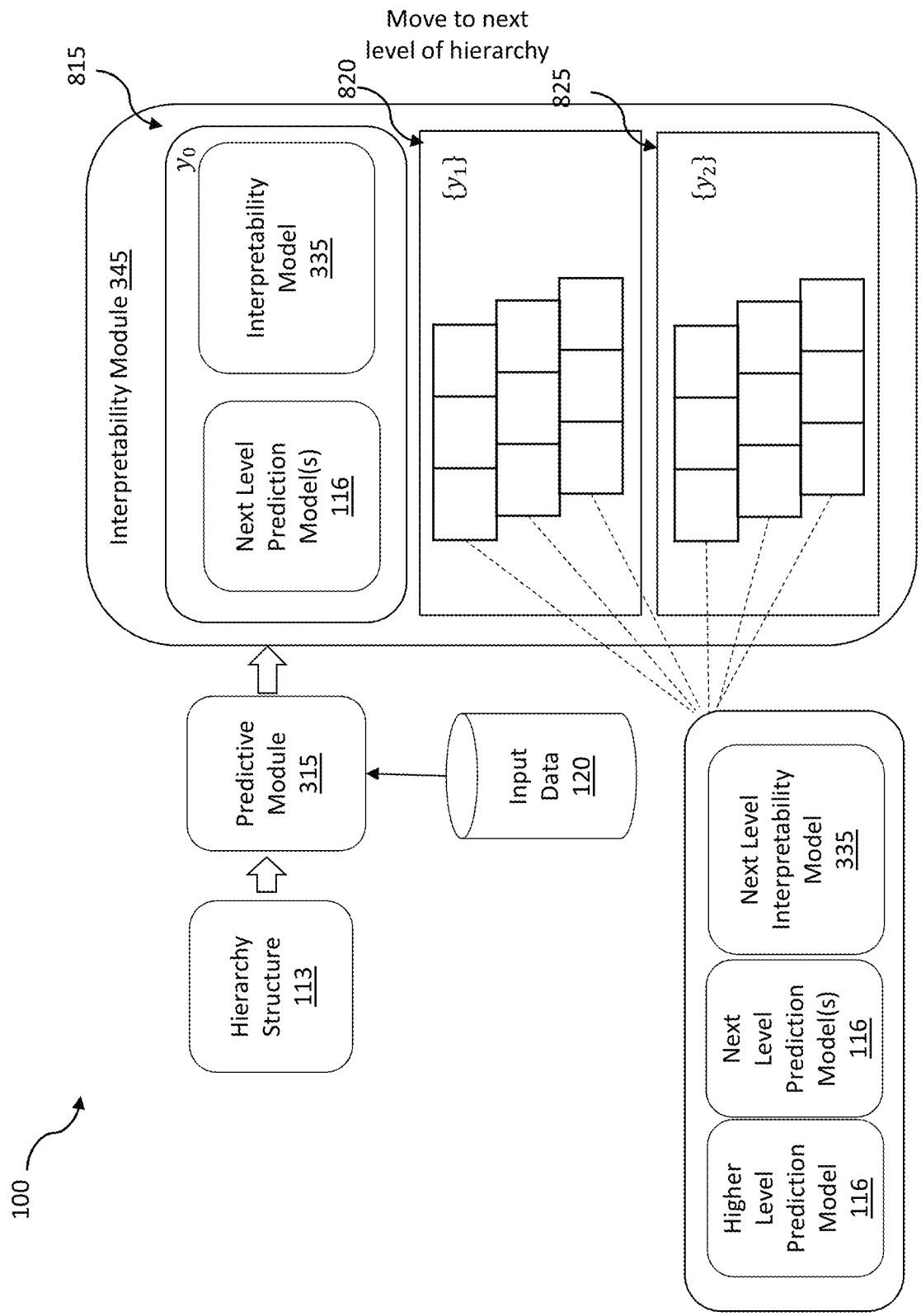
FIG. 9 depicts an illustrative example of an example system for generating and running predictive models that use decomposable hierarchical structures of utilized features to generate results that are more easily interpreted in accordance with one more embodiments of the invention.

The following will provide, with reference to the figures, detailed descriptions of example systems for providing interpretability for predictive models using decomposable hierarchical structures in accordance with embodiments of the invention. An example of machine learning techniques that can be used to implement aspects of the invention will be described with reference to FIGS. 1 and 2. Machine learning models configured and arranged according to embodiments of the invention will be described with reference to FIG. 3. FIG. 4 depicts an illustration of an example hierarchical structure. FIG. 6 depicts an illustration of an example of an attention model used to train predictions at a given granularity. FIG. 7 depicts an illustrative example of training models using a hierarchical structure. FIG. 8 depicts an illustrative example of quantifying the interaction of factors based on the difference on the course level of prediction with immediate next level of prediction. FIG. 9 depicts an illustrative example of an example system for generating and running predictive models that use decomposable hierarchical structures of utilized features to generate results that are more easily interpreted. FIG. 10 depicts an illustrative example of pseudo code for an algorithm for adding interpretability with decomposable hierarchical structures. FIG. 11 depicts a flow diagram of a method for providing interpretability for predictive models using decomposable hierarchical structures. In addition, detailed descriptions of an example computing system and network architecture capable of implementing one or more of the embodiments described herein will be provided with reference to FIG. 12.

FIG. 1 depicts a block diagram showing a system 100 capable of implementing various aspects of the invention described herein. More specifically, the functionality of the system 100 is used in embodiment of the invention to generate the various models (e.g., predictive model 116 and interpretability model 335 shown in FIG. 3). The system 100 includes multiple data sources 102 in communication through a network 104 with a predictor 110. In some aspects of the invention, the data sources 102 can bypass the network 104 and feed directly into the predictor 110. The data sources 102 provide input data 120 that includes data/information inputs that will be evaluated by the predictor 110 in accordance with embodiments of the invention. The data sources 102 also provide data/information inputs that can be used by the predictor 110 to train and/or update model(s) 116 created by the predictor 110. The data sources 102 can be implemented as a wide variety of data sources, including but not limited to, sensors configured to gather real time data, data repositories (including training data repositories), and outputs from other predictors. The network 104 can be any type of communications network, including but not limited to, local networks, wide area networks, private networks, the Internet, and the like.

The predictor 110 can be a programmable computer such as a computer system 1100 (shown in FIG. 12) that executes one or more algorithms. As shown in FIG. 1, the predictor 110 includes a suite of machine learning (ML) algorithms 112; and model(s) 116 that are relationship (or prediction) algorithms generated (or learned) by the ML algorithms 112. The algorithms and/or models 112, 116 of the predictor 110 are depicted separately for ease of illustration and explanation. In embodiments of the invention, the functions performed by the various algorithms 112, 116 of the predictor 110 can be distributed differently than shown. For example, where the predictor 110 is configured to perform an overall task having sub-tasks, the suite of ML algorithms 112 can be segmented such that a portion of the ML algorithms 112 executes each sub-task and a portion of the ML algorithms 112 executes the overall task.

The ML algorithms 112 receive and evaluate input data (i.e., training data and data-under-analysis) from the data sources 102. The ML algorithms 112 includes functionality that is necessary to interpret and utilize the input data's format. For example, where the data sources 102 include image data, the ML algorithms 112 can include visual recognition software configured to interpret image data. The ML algorithms 112 apply machine learning techniques to received training data (e.g., data received from one or more of the data sources 102) in order to, over time, create/train/update one or more models 116 that model the overall task and the sub-tasks that the predictor 110 is designed to complete.

Figure 2:
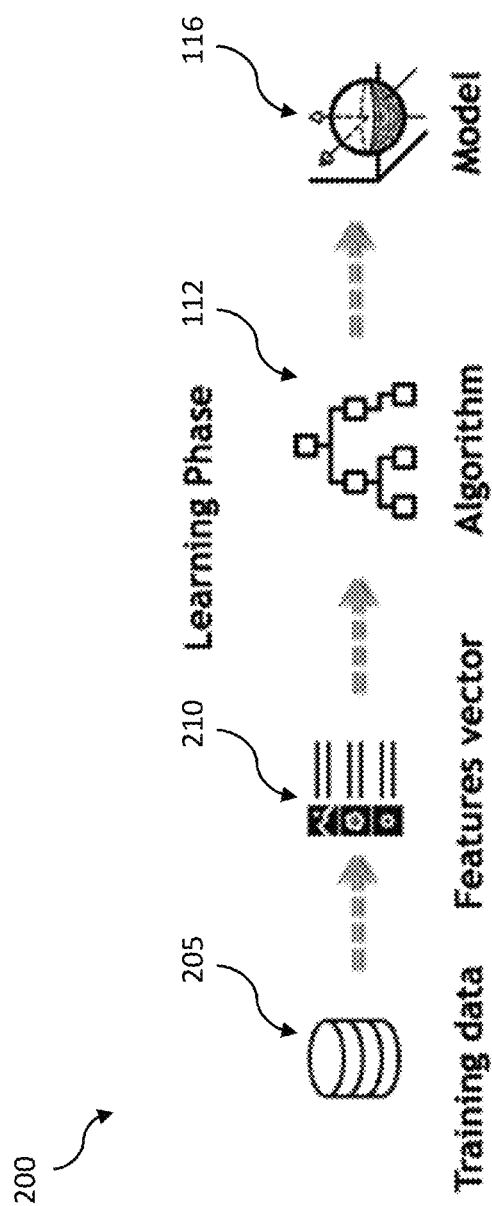
FIG. 2 depicts a learning phase that can be implemented by the machine learning system shown in FIG. 1.

Referring now to FIG. 2, an example of a learning phase 200 performed by the ML algorithms 112 to generate the above-described models 116 is depicted. In the learning phase 200, the predictor 110 extracts features from the training data 205 and coverts the features to vector representations that can be recognized and analyzed by the ML algorithms 112. The training data 205 can be received as part of the input data 120 from the one or more data sources 102. The feature vectors 210 are analyzed by the ML algorithm 112 to "predict" one or more results using the training data and the target model (or the model's task). The ML algorithm 112 facilitates to uncover relationships between and among the features in the training data 205. Examples of suitable implementations of the ML algorithms 112 include but not limited to attention neutral network and general additive models etc. The learning or training performed by the ML algorithms 112 can be supervised in one or more embodiments of the present invention.

When the models 116 are sufficiently trained by the ML algorithms 112, the data sources that generate "real world" data are accessed, and the "real world" data is applied to the models 116 to generate usable versions of the input data 120. In some embodiments of the invention, the input data 120 can be fed back to the predictor 110 and used by the ML algorithms 112 as additional training data 205 for updating and/or refining the models 116.

In aspects of the invention, the ML algorithms 112 and the models 116 can be configured to apply confidence levels (CLs) to various ones of their results/determinations (including the input data 120) in order to improve the accuracy of the particular result/determination that is output 130 by the predictor 110. When the ML algorithms 112 and/or the models 116 make a determination or generate a result for which the value of CL is below a predetermined threshold (TH) (i.e., CL<TH), the prediction result 130 can be classified as having sufficiently low "confidence" to justify a conclusion that the prediction result 130 is not valid, and this conclusion can be used to determine when, how, and/or if the prediction result 130 are handled in downstream processing. If CL>TH, the prediction result 130 can be considered valid, and this conclusion can be used to determine when, how, and/or if the prediction results 130 are handled in downstream processing. Many different predetermined TH levels can be provided. The determinations/results with CL>TH can be ranked from the highest CL>TH to the lowest CL>TH in order to prioritize when, how, and/or if the determinations/results are handled in downstream processing.

In aspects of the invention, the predictor 110 can be configured to apply confidence levels (CLs) to the input data 120. When the predictor 110 determines that a CL in the input data 120 is below a predetermined threshold (TH) (i.e., CL<TH), the input data 120 can be classified as sufficiently low to justify a classification of "no confidence" in the input data 120. If CL>TH, the input data 120 can be classified as sufficiently high to justify a determination that the input data 120 are valid. Many different predetermined TH levels can be provided such that the input data 120 with CL>TH can be ranked from the highest CL>TH to the lowest CL>TH.

The functions performed by the predictor 110, and more specifically by the ML algorithm 112, can be organized as a weighted directed graph, wherein the nodes are artificial neurons (e.g. modeled after neurons of the human brain), and wherein weighted directed edges connect the nodes. The directed graph of the predictor 110 can be organized such that certain nodes form input layer nodes, certain nodes form hidden layer nodes, and certain nodes form output layer nodes. The input layer nodes couple to the hidden layer nodes, which couple to the output layer nodes. Each node is connected to every node in the adjacent layer by connection pathways, which can be depicted as directional arrows that each has a connection strength. Multiple input layers, multiple hidden layers, and multiple output layers can be provided. When multiple hidden layers are provided, the predictor 110 can perform unsupervised deep-learning for executing the assigned task(s) of the predictor 110.

Similar to the functionality of a human brain, each input layer node receives inputs with no connection strength adjustments and no node summations. Each hidden layer node receives its inputs from all input layer nodes according to the connection strengths associated with the relevant connection pathways. A similar connection strength multiplication and node summation is performed for the hidden layer nodes and the output layer nodes.

The weighted directed graph of the predictor 110 processes data records (e.g., outputs from the data sources 102) one at a time, and it "learns" by comparing an initially arbitrary prediction of the record with the known actual prediction of the record. Using a training methodology knows as "back-propagation" (i.e., "backward propagation of errors"), the errors from the initial prediction of the first record are fed back into the weighted directed graphs of the predictor 110 and used to modify the weighted directed graph's weighted connections the second time around, and this feedback process continues for many iterations. In the training phase of a weighted directed graph of the predictor 110, the correct prediction for each record is known, and the output nodes can therefore be assigned "correct" values. For example, a node value of "1" (or 0.9) for the node corresponding to the correct class, and a node value of "0" (or 0.1) for the others. It is thus possible to compare the weighted directed graph's calculated values for the output nodes to these "correct" values, and to calculate an error term for each node (i.e., the "delta" rule). These error terms are then used to adjust the weights in the hidden layers so that in the next iteration, the output values will be closer to the "correct" values.

A technical challenge with existing systems that implement such predictive model-based data is that all of the features in the input data 120 are used to build a single predictive model. Because the predictive model is built using machine learning techniques, the interaction between the features when generating the prediction result 130 may not be readily discernable. Further, in existing solutions, the predictive system 100 cannot be programmed to use the interaction between one or more features to generate the prediction result 130. Embodiments of the present invention address such technical challenges by using an hierarchical structure 113. The hierarchical structure 113 can be predefined by one or more experts or by curating data interpretation by one or more experts. Here, the experts include subject matter experts in the domain/field of the input data 120 that the predictor 110 uses to generate the prediction result 130 based on the predictive models 116. In one or more embodiments of the present invention, the predictive models 116 are generated using the hierarchical structure 113. The predictor 110, by using the hierarchical structure 113, can further provide an interpretability of the predictive models 116 that are used to generate the prediction result 130.

The hierarchical structure 113 can be input to the predictor 110 as part of the input data 120. Alternatively, or in addition, the hierarchical structure 113 is input directly, independent of the input data, to the predictor 110.

Figure 3:
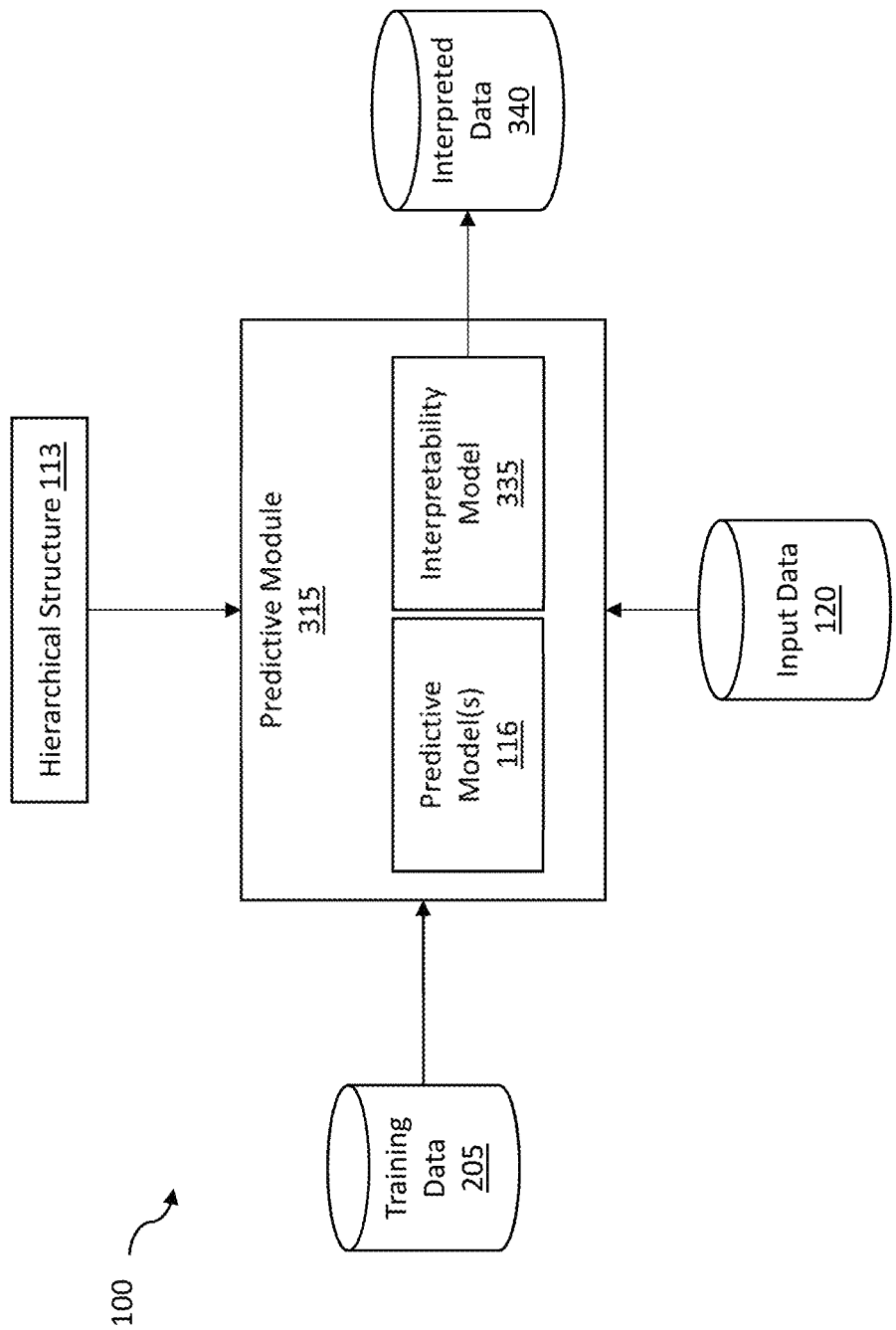
FIG. 3 depicts a block diagram of a configuration of machine learning models and components configured and arranged in accordance with one or more embodiments of the invention.
Figure 4:
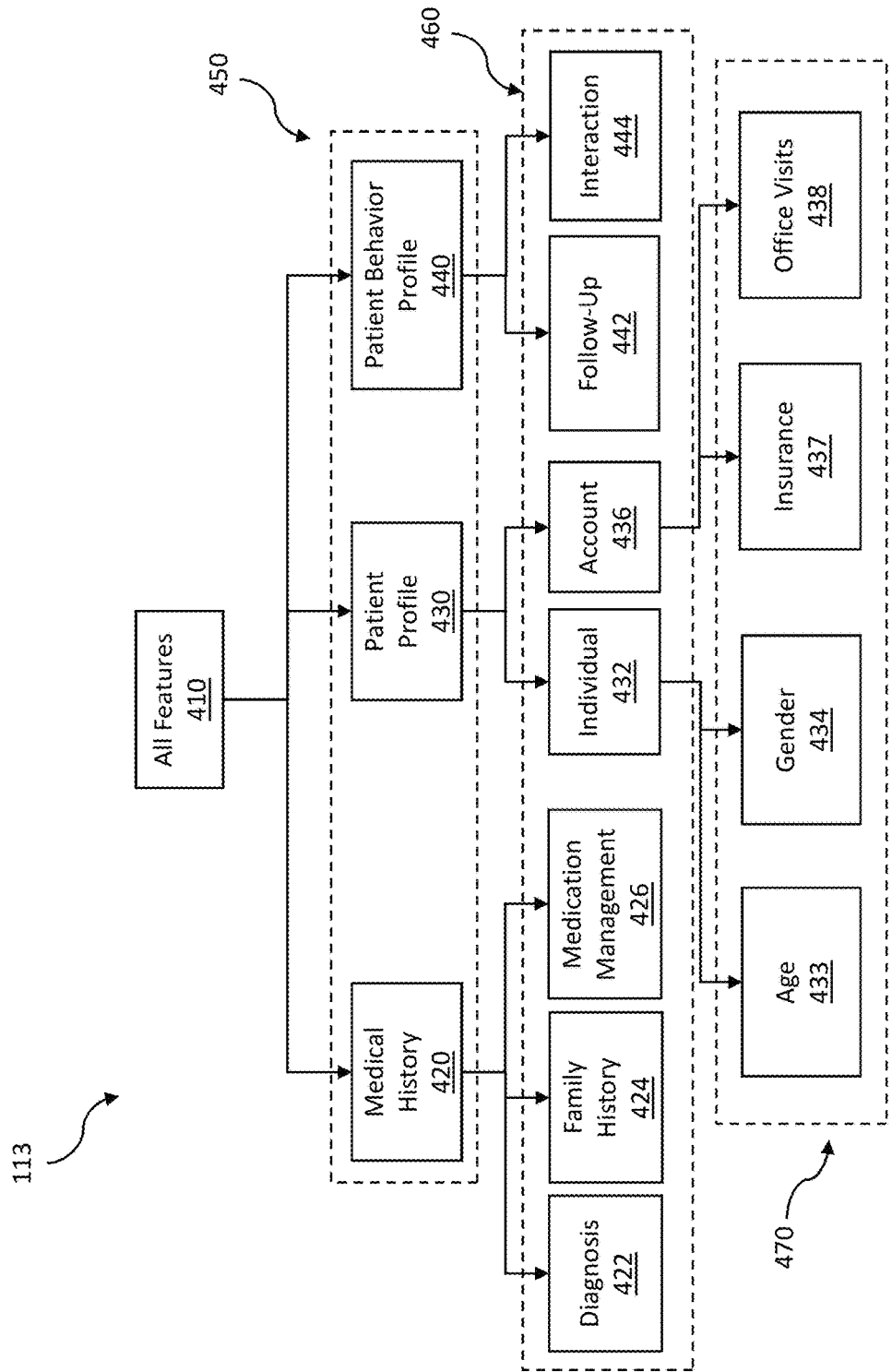
FIG. 4 depicts an illustration of an example hierarchical structure in accordance with one or more embodiments of the invention.

FIG. 3 depicts a block diagram of a configuration 100 of machine learning models and components of the system 100 in accordance to embodiments of the invention. FIG. 3 depicts a different view of the system 100 that was depicted in FIG. 1. The system 100 can be implemented in a variety of ways. As will be described in greater detail below, one or more of the modules described herein can, when executed by at least one processor of a computing device (e.g., computer system 1100 shown in FIG. 12), enable the system 100 to provide interpretability for predictive models using decomposable hierarchical structures. For example, and as will be described in greater detail herein, the example system 100 can receive, historical data 310 from one or more data sources 102. The historical data 310 can include data collected from one or more systems in industry, including data associated with users, executed actions and corresponding outcomes, relationship data among features and/or attributes, and the like. The historical data 310 can be collected from a specified period of time, across different systems or entities, or the like. In some examples, the historical data 310 can be used by a predictive module 315 for training one or more predictive models 116. The historical data 310 includes current data which can be used to generate one or more predictions by a predictive model 116 executed by the predictive module 315.

In some examples, the predictive module 315 receives the historical data 310 and/or accesses to the historical data 310. The historical data 310 can be received by the predictive module 315 in predefined portions or can be received as they are received by the system 100. In some examples, the predictive module 315 can train different types of predictive models 116, such as a multilayer perceptron (MLP) model, attention model, convolutional neural network (CNN), or any other machine learning techniques. The predictive module 315 trains the one or more predictive models 116 using the training data 205, which includes expected predictions for specific input values. Although depicted separate from the input data 120, the training data 205 can be part of the input data 120. The predictive models 116 each operate on subsets of the features of the input data 120 to generate respective predictions. The predictions can be combined to generate a final prediction result 130. Alternatively, or in addition, in one or more embodiments of the present invention, one of the predictive models 116 operates on all of the features to generate the final prediction result 130, while the other predictive models 116 are used to determine an interpretability of the prediction result 130. The separation of the features among the several predictive models 116 is performed based on the hierarchical structure 113.

In one or more embodiments of the present invention, the predictive module 315 uses the system 100 expert hierarchy 113 to generate an interpretability model 335. The interpretability model 335 is trained to determine interaction scores between one or more of the predictive models 116. In turn, the interpretability model 335 is trained to determine interaction scores for the subsets of the features that are used by the respective predictive models 116.

Once the predictive models 116 and the interpretability model 335 are trained, the predictive module 315 is used to generate the prediction result 130 using "live" data, i.e., input data 120 for which results are unknown. For example, users from an industry may provide industry data as input to the system 100. The industry data can be stored in a data store and/or can be provided directly. The industry data includes best practices of an industry, features and attributes of different aspects of an industry (e.g., user demographics, transactions, interactions, financial information, risk assessments, etc.), and the like. The industry data 305 can also include relational information between the information provided.

The system 100 receives the industry data and/or access to the industry data and generates the model inputs with different granularities for the predictive models 116 based on the hierarchical structure 113. In some examples, the hierarchical structure 113 is a data structure, such as a tree structure. Each level of the tree structure includes one or more partitions. Each partition is a set of features belonging to the same data source and/or having similar properties (e.g., industry properties, data attributes, etc.). It is understood that the partitioning can be done based on various factors that can vary in different embodiments, and that all of such factors are not described herein. Different levels of the hierarchical structure 113 provide a different granularity of the same data. The features at the top of the tree structure of the hierarchical structure 113 can be the union of all the available features from the different partitions. The levels of the hierarchical structure 113 are designated by a user and/or based on the need for the depth of the reasoning to provide as the context for the target results generated by the machine learning models, such as predictive models 116.

In one or more embodiments of the present invention, the interpretability model 335 includes a set of an attention predictive models that uses the hierarchical structure 113 to generate interpreted data 340 based on the input data 120. The interpreted data 340 includes information associated with the predictive scores or outputs from the set of predictive models 116. The interpreted data 340 can further include the partitions of features in the input data 120 and interpretable reasoning associated with forming the partitions of features based on the hierarchical structure 113, predicted score or values generated for one or more partitions (and/or sub-partitions) of features and/or attributes identified in the input data 120 based on the hierarchical structure, identification of factors that impacted the input data 120, and the like. The interpreted data 340 can provide a score associated with features or partitions in the hierarchical structure as well as contextual reasoning and explanations to provide additional context to the partitioning of the input data 120. Users of the system can use the interpreted data 340 to create interpretable attention (e.g., weights) and identify suitable controllable actions from the attention (or weights) as described herein.

FIG. 4 depicts an illustration of an example hierarchical structure 113 in accordance with one or more embodiments of the disclosure. The hierarchical structure 113 is a data structure used to provide interpretability at all levels of the hierarchy using a decomposable approach applied to the input data 120 that is used by the predictive models 116 to generate the prediction result 130. In some examples, the hierarchical structure 113 is based on industry best practices, which can be provided by users of an industry as part of industry data provided to the system 100 and/or generated from historical data 310 using one or more ML algorithms 112.

In each layer of the hierarchical structure 113, there are several partitions or groups of features. Each feature is associated with a score to predict an outcome. The overall score of the prediction result 130 can be a weighted average of the results from each partition (and sub-partition) of features.

In the example illustrated in FIG. 4, the root node 410 of the hierarchical structure 113 indicates all the features, which are partitioned into three partitions at a lower level of the tree data structure—the medical history partition 420, the patient profile partition 430, and the patient's behavior profile partition 440. Each of the partitions is the parent of a set of related features. For example, the medical history partition 420 is the parent of the following features—diagnosis partition 422, family history partition 424, and medication management partition 426. The patient profile partition 430 includes an individual partition 432 (which is the parent of the age attribute 433 and the gender attribute 434) and the account partition 436 (which is the parent of the insurance attribute 437 and the office visits attribute 438). The patient behavior profile partition 440 is the parent of the follow-up partition 442 and the interaction partition 444. Each of the different levels of the hierarchical structure 113, namely 450, 460, and 470, represents a different level of granularity and detail. Note that "levels" are different from "partitions", and that a level can include one or more partitions. For example—the patient profile partition 430, which is one of the partitions in the level 450, encompasses different aspects about a patient, such as their demographic information as well as their account information. All the features related to a patient are indicated at level 450 by the patient profile partition 430, but as the information is further divided into lower levels (e.g., level 460 and 470), the information pertaining the patient becomes more detailed. For example, the age and gender of the patient is stored at level 470 and indicates a specific value for the patient's age or gender, respectively. The number of levels in the hierarchical structure can be designed by a user during the generation of the hierarchical structure and can depend on the need for the depth of the reasoning to provide as context for the prediction result 130 that is output by the predictive models 116.

It should be noted that the hierarchical structure 113 depicted in FIG. 4 is one possible example in an example scenario of patient data, and that in the same example scenario, various other representations of the hierarchical structure 113 can be generated. Further, in other example scenarios, for example, financial data, business operational data, image recognition data, automated driving data, or any other types of data to be processed by machine learning, different hierarchical structures can be created. In some examples, users are able to add new partitions to the hierarchical structure 113 by, for example, instantiating an existing partition using a different data set.

Figure 5:
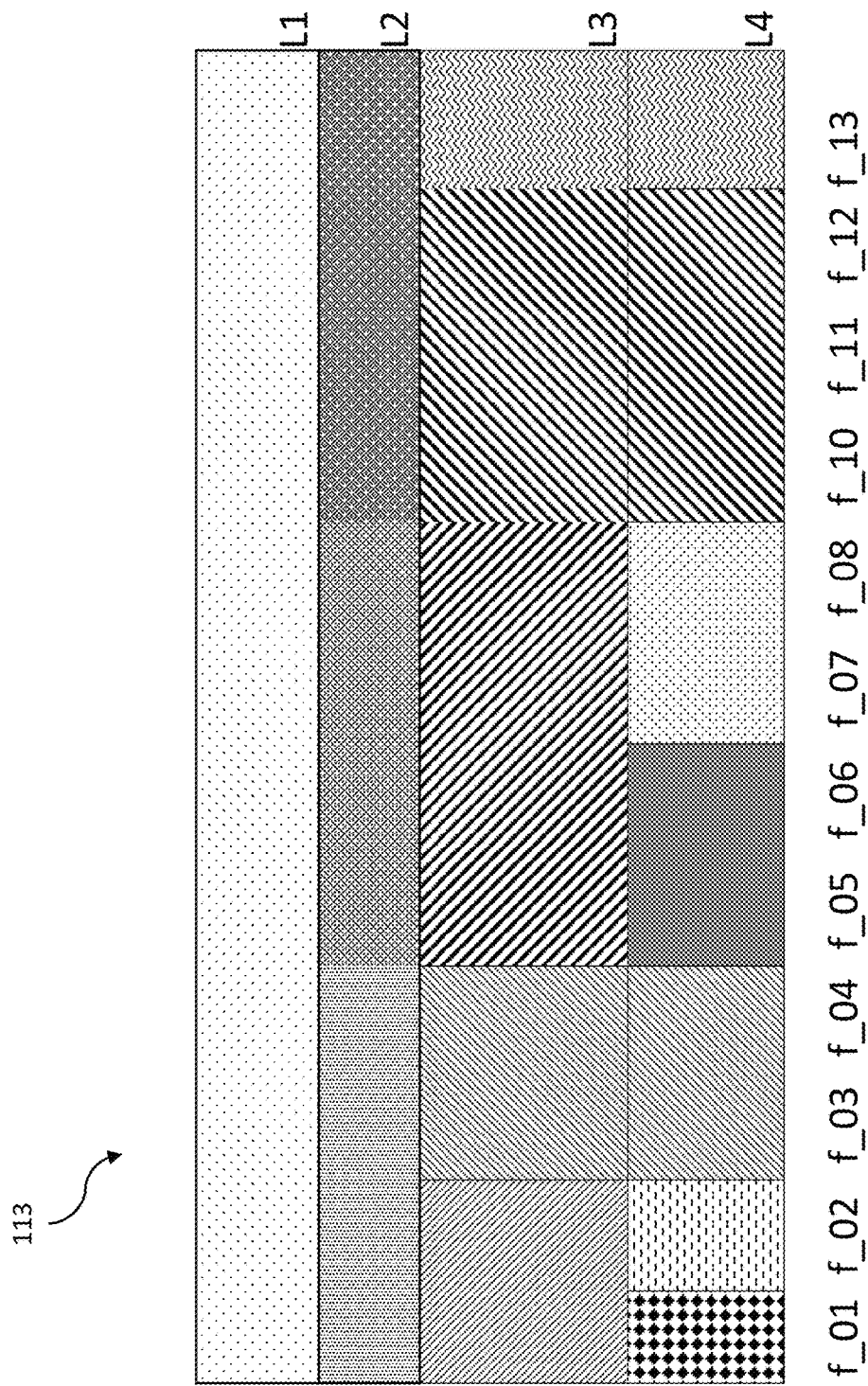
FIG. 5 depicts an illustration of an example hierarchical structure in accordance with one or more embodiments of the invention.

FIG. 5 depicts a visual representation of the hierarchical structure 113 according to one or more embodiments of the present invention. The depicted hierarchical structure 113 is another view, different from the view of the structure depicted in FIG. 4. Here, the representation is provided to show that all of the levels (L0-L4) provide different granularity over the same data, and also that each level can be partitioned in different manner. For example, in FIG. 5, L0 represents a top layer, without any partition. Further layers, for example, L2, L3, and L4, have partitions. The bottom most layer, L4, includes the atomic features, f_01, f_02, . . . , f_13. Here, "atomic features" represent data that is not further broken down/detailed. It should be noted that the number of partitions, number of sub-partitions, and number of layers can vary in other examples.

In this example, there are four levels, L1, L2, L3, and L4, in the hierarchical structure. Each level has corresponding numbers of partitions that are feature groups. Each level has its own attention model as a predictive model, from among the predictive models 116. Each respective predictive model 116 utilizes same input data but grouped into different granularities to generate output scores. The output scores of the attention models for each level represent weightage of each partition from that level. For a given instance of input data 120, each predictive model generates a score for each level in the hierarchical structure 113. The overall score is the weighted average of the weighed scores of each group. The atomic features f_01 to f_13 are depicted at the lowest level (below L4). The partitions in each of the levels L1 to L4 group these features in different combinations. The example grouping shown in FIG. 5 can be represented as provided in Table 1 herein.

TABLE 1

Example of Hierarchical Structure and Feature Partitioning

| Predictive Attention Models | Feature Grouping | # Feature Groups |
|---|---|---|
| Top Level Model | (f_01, . . . , f_13) | 1 |
| Second Level Model | (f1, . . . , f04), {f_05, . . . , f_08}, (f_09, . . . , f_13} | 3 |
| Third Level Model | {f_01, f_02}, {f_03, f_04}, {f_05, . . . , f_08}, (f_10, f_f_11, f_12}{f_13} | 5 |
| Fourth Level Model | {f_01}, {f_02}, {f_03, f_04}, {f_05, f_06}, {f_07, f_08}, (f_10, f_f_11, f_12}{f_13} | 7 |

The first level, L1, includes all of the features f01-f13 in a single group, whereas the second level L2 divides the features into three groups, the third level L3 divides the features into five groups, and the fourth level L4 includes seven groups. As can be seen, the groups in a one level partition the features in a different manner from the partitions in another level.

FIG. 6 depicts an illustration of an example of an attention model 500 used to train predictions at a given granularity in accordance with one or more embodiments of the disclosure. In some examples, the interpretability model 335 can be an attention model 500 used to train predictions at specified levels of granularity of the hierarchical structure 113. In some examples, the interpretability model 335 can be an attention model 500 where input variables 510 can be expert networks, such as the expert networks 505A, 505B, 505C (collectively 505). Expert networks 505 can be neural networks. In one or more embodiments of the present invention, the expert networks 505 are the predictive models 116. The attention model 500 can use a gating network to use a smooth soft attention function. The input variables 510 of the attention model 500 can include a number of variables for a given expert network. Each expert network 505 represents an input attribute or group of input attributes. In some examples, the input variables 510 can be provided as an array of arrays. The expert networks 505 can be inputs to one or more activation functions 515A, 515B, 515C (collectively 515). An activation function can define the output given an input or a set of inputs, such as the expert networks 505. Examples of activation functions 515 include, but are not limited to, the tanh function, rectified linear unit (ReLU) function, softmax function (also known as softargmax or normalized exponential function). The output of the activation functions 515 can include a number of variables to be predicted by the attention model 500. The attention model 500 can use hyper-parameter auto-tuning 520 on the output of the activation functions 515. Hyper-parameter auto-tuning 520 can be performed using an ensemble of techniques, which can include grid search, random search, and exponential learning, using a validation data set. For training purposes, the interpretability model 335 can use the best hyper-parameters values and a stochastic gradient approach as well as multiple training streams to handle randomness in initialization. In one or more embodiments of the present invention, the interpretable result is computed based on at least the following: 1) a score or value of a model for a single feature without considering scores/influence of other grouped features; and 2) the contribution of each set of grouped features, as the product of the score (value) and the corresponding weight. The interaction of the group of features is calculated by the comparison of the outputs of two models from two levels of feature grouping (lower level is partitioned more, another layer grouped together).

FIG. 7 depicts an illustrative example of training models 600 using a hierarchical structure in accordance with one or more embodiments of the invention. In some examples, the model 600 is trained using an attention modeling approach and the hierarchical structure 113 to decompose features into partitions providing interpretability to the partitions and features. Predictions using the trained model can use a multilayer perceptron. By training the model and performing the decomposition on the features, the system is able to provide interpretability of the features for a user. Decomposition of the features into partitions at different levels enables identification of interactions between partitions of features and levels and how partitions and/or features impact the different levels of features (e.g., level 1, level 2, etc. in FIG. 5). In some examples, the interaction of the partitions of features is calculated by comparison of the outputs of two models for two levels of partition groupings (e.g., lower layers are further partitioned, etc.).

Level 1 (L1 in FIG. 5) of the model represents all the features of the training model. The features are decomposed into two or more partitions of features in L2 (FIG. 5). In this case, two partitions E1 610 and E2 620 are depicted. All the features are represented by node 605 at level 1. The features are partitioned at level 2 into E1 610 and E2 615. Respective predictive models 116 are trained for using the three partitions in this setup, a first predictive model for the partition 605 for all the features, a second predictive model for the partition E1 610, and a third predictive model for the partition E2 615. Further, an attention model can use an ensemble approach for the different decomposed partitions to obtain an overall score for the entire feature set, while ensuring that a score for each partition is generated to represent its impact or interaction value in the training model. The attention model represents the interpretability model 335. The overall score can be computed by applying weights to the different partitions (e.g., 0.4 for E1 610 and 0.6 for E2 615). In some examples, the weights are not constant and are changed or modified for different reasons (e.g., client needs, targeted object, etc.). The training model can repeat the steps for each level until there are no further factors to decompose (at 620), until L4 in the example hierarchical structure 113 in FIG. 5. It should be noted that the weight values, number of partitions, and other specifics shown in the figures herein are exemplary, and in other embodiments, such values can vary.

FIG. 8 depicts an illustrative example 700 of quantifying the interaction of factors based on the difference on the course level of prediction with immediate next level of prediction in accordance with one or more embodiments of the invention. In some examples, the system 100 can train an interpretability model 335 using the hierarchical structure 113. The interpretability model 335 quantifies the interaction of two or more factors ($x_1$ and $x_2$). Here, "factors" can include groups of features for which the interaction is being determine. For example, the interpretability model quantifies the interaction of the partition E1 610 and the partition E2 615 (see FIG. 7). The node 710 at level 1 represents the entire set of input data 120 being used by a predictive model 116. The input data 120 can be partitioned into different partitions, namely E1 715 and E2 720. As illustrated in the table 702, level 1 represents the input data 120 and level 2 represents the partitions E1 715 and E2 720. Each partition of data is processed to determine and associated interpretability of outcomes resulting from that partition. In one or more embodiments of the present invention, the interpretability module 335 that is used to determine and associate such interpretability with a first partition can be different from the interpretability model 335 that is used for a second partition. That is, to discover the interpretability and interactions of the features in the input data 120, a set of interpretability models 335 can be used. For example, the set includes separate interpretability models 335 for each partition respectively. Alternatively, each partition can be associated with interpretability information using multiple interpretability models 335 from the set.

In the example scenario of FIG. 8, the hierarchical structure has two layers—L1 and L2. The input data 120 is processed using model $h_0(x_1, x_2)$ and an attention (or weight) of 1.0. E1 715 of layer L2 is processed using model $f_1(x_1)$ and attention (weight) $w_1$, whereas E2 720 of L2 is processed using model $g_1(x_2)$ and attention $w_2$. Here, h0, f1, and g1, represent the predictive models 116 associated with those partitions. The interaction between the two partitions E1 715 and E2 720 can be illustrated as follows: Interaction of E1 and E2=$h_0(x_1, x_2) - w_1 * f_1(x_1) - w_2 * g_1(x_2)$.

FIG. 9 depicts an illustrative example of an example system for generating and running predictive models that use decomposable hierarchical structures of utilized features to generate results that are more easily interpreted in accordance with one more embodiment of the invention. The system 100 is considered to be trained, with the predictive models 116 being trained to generate their respective predictions based on the group of features that they are trained with. Further, the interpretability models 335 are also trained to determine an interaction score between each partition in each of the levels in the hierarchical structure 113. The industry data is used as the input data 120 into the system 800. The industry data 305 can be stored in a data store and/or can be provided directly to the system 100. The industry data can include relational information between the features information provided, and is structured in a predetermined manner that the system 100 has been trained to process and generate the prediction result 130. The hierarchical structure 113 is also provided to the system 100 to partition the input data 120 so that interpretability can also be provided along with the prediction result 130.

The predictive module 315 uses the one or more predictive models 116 to process the input data 120 to generate predictions and other results according to the training. The predictions from the predictive module 315 can be difficult to understand despite its accuracy and may not provide context for how the one or more features and/or groups of features (i.e. partitions) in the input data 120 were used by the predictive models 116 to generate the prediction result 130. Alternatively, or in addition, it may be difficult to interpret what the prediction result 130 indicates.

In some example embodiments, the system 100 can receive the input data 120 and add the interpretability. The system 100 can partition the input data 120 generated by the predictive module 315 into partitions of features according to the hierarchical structure 113. The input data 120 is partitioned separately for each of prediction models 116. As noted earlier, each partition in each level of the hierarchical structure 113 has its own corresponding prediction model 116. Further, each partition can be divided into sub-partitions in a next (subsequent) level until the last level at which the features are considered atomic. Accordingly, the input data 120 is further partitioned into mutually exclusive sets of features until the last level in the hierarchical structure 113. All of the partitions, when combined, (e.g., union operation) provide a complete coverage of the features of the input data 120.

The interpretability model 335, at each level of the hierarchical structure, can be an attention model that can provide a prediction score for each partition. Depending on whether the partitions are generated using classification or regression techniques, the interpretability model 335 can generate a score for each partition of grouped features. The prediction score of a partition (i.e., group of features) can be interpreted as a quantified influence of that partition on the final prediction result 130 without consideration of the other features in the input data. The interpretability model 335 can generate an overall score of the prediction result 130 based on a weighted approach, where each of the partitions (and sub-partitions) are weighted and all the weighted scores are used to calculate the overall score. The weight applied to the partitions can be based on different factors and is a non-negative value for each of the partitions. In some examples, the sum of the different weights used for the different partitions equal one. In some example, the contribution of a given partition of features to the overall prediction result 130 is its weight multiplied by its score.

As depicted in FIG. 9, the system 100 receives the input data 120. All the features from the input data 120 are represented at level L1 $y_0$ 815, which includes all the features of the input data 120. The system 100 processes the input data 120 for each level in the hierarchical structure 113, e.g., by prediction models and/or interpretability model 335. In one or more embodiments of the present invention, each level in the input data 120 is iteratively processed according to each level in the hierarchical structure 113. The input data 120 is decomposed into mutually exclusive sub-partitions at level $y_1$ 820 and scores are generated for each partition or sub-partition as such processing is performed. The system 100 processes the input data 120, decomposing the features into partitions and sub-partitions at different levels (e.g., $y_0$ 815, $y_1$ 820, $y_2$ 830, etc.) and generating scores for each partition (and sub-partition) until they can no longer be decomposed. The score and the partitions of features are used to provide interpretability of the input data 120 at different levels of granularity based on the different decomposed partitions and sub-partitions generated from the input data 120.

FIG. 10 depicts an illustrative example of pseudo code 900 for an algorithm for adding interpretability with decomposable hierarchical structures in accordance with one or more embodiments of the invention. The pseudo code 900 depicts how decomposition of the features into partitions is executed and calculates interactions between partitions. The interactions provide interpretability to the features and how the different partitions can impact other partitions and the overall score for a feature set.

The algorithm can be a tree walk per the hierarchical structure 113 with breadth-first traversal from top-to-bottom. The first step of the algorithm can include using the hierarchical structure 113 as an expert model and partitioning the training data 205 according to the hierarchical structure 113. In the next step the training data 205 is used to build predictive models 116. For each partition, Y can be assigned to Y_, where Y_ is the TRUE target or expected prediction outcome for that partition. Consider that a partition includes the feature set $X \in \{x_1, x_2, \ldots, x_K\}$ for $i \in [1,k]$, where k is the total number of selected features in the input data 120. A predictive model 116 ($[\{X\}, \{Y\}]$) can be built with predicted outcome $Y_0$ for the partition. Several predictive models 116 for each of the partitions, respectively, can be generated in this manner.

The third step can be an iterative step to assign the interpretability to the predictive models 116. For example, a predictive model 116 is selected for the topmost partition (that includes all of the features) and that has a known outcome (e.g., $Y \leftarrow Y_0$). A decomposition loop for the topmost partition is executed by initiating a tree walk through the hierarchical structure 113. The decomposition loop is iterated for each subsequent partition that is encountered. It should be noted that all of the subsequent partitions are going to be subsets of the first partition that is at the topmost level (L0) because of the manner in which the hierarchical structure 113 is partitioned. The decomposition of the features in a selected partition includes taking the following steps:

1. Decompose the set of features $X = U_1^N X_j$.
   a. The input is the set of features in the selected partition, the features are partitioned into mutually exclusive subsets. Consider that $X_j$ is the set of features for a partition j. Consider that $Y_1$ is the expected outcome for the partition j;
   b. Build the interpretable model 335 for the selected partition using the remaining partitions in the same level and the selected target $Y_1$
2. The above step can be iteratively repeated for each level in the partition X by selecting the next level partition in $X_j$. For example, assign $X \leftarrow X_j$ and $Y \leftarrow Y_{1j}$ (here $Y_{1j}$ is the expected outcome of $X_j$ at this next level that is now being decomposed).

The above steps are repeated until the last level in the hierarchical structure 113 is reached, and for each partition.

In some example embodiments, a top-to-bottom approach is utilized, where a current model with interpretability using additive (or logarithmic additive) modeling approach is used. Each factor (e.g., partition of features) contributes to the final score or value (e.g., prediction or probability). The contribution of each factor is the multiplication of weight, and the score associated with each factor. In some example, the weight used for each factor can be a constant value. In some examples, the weight can be dynamically adjusted based on different needs of a client or sample.

A weakness of the top-to-bottom approach can include that the additive model typically has constrained model architecture, which can limit the accuracy of the model. If there are too many factors (i.e., partitions) involved, the contribution of each of the factors could be negatively influenced by other factors. In some cases, the collected impact (e.g., interaction) of multiple factors that fall within the same category can be hard to identify.

In some example embodiments, the weakness of the additive model can be contained by including the interactions of the factors with the hierarchical structure 113. The additive model can be used by the required granularity from the industry knowledge professional.

In some examples, the system 100 determines a selection of input data 120 to use for training the interpretability model 335. For example, in a first option, the system 100 selects the option of using the outcome of previously trained models, which removes the outliers from statistical results but moves away from true (accurate) outcomes. In a second option, the system 100 selects using the outcome of the MLP training model. This provides the most accurate results from the statistical assessment using all the features of the input data 120, reflecting the prediction based on all known knowledge, and removing certain noise from the TRUE target. However, the results can contain certain 'noise' or outliers. The third option may enable the interpretability model 335 to use the true target data, which ensures that all features of the partition have a score or prediction tuned into the TRUE target. However, the results can contain certain 'noise' or outliers.

FIG. 11 is a flow diagram of another example computer-implemented method 1000 for providing interpretability for predictive models having decomposable hierarchical layers configured to generate interpretable results. The steps shown in FIG. 11 can be performed by any suitable computer-executable code and/or computing system. In one example, each of the steps shown in FIG. 11 represents an algorithm whose structure includes and/or is represented by multiple sub-steps, examples of which will be provided in greater detail below.

As illustrated in FIG. 11, at step 1002 one or more of the systems described herein can receive a hierarchical structure 113. The systems described herein can perform step 1002 in any suitable manner. In some examples, the system 100 receives data, such as industry data, from one or more data sources in conjunction with the hierarchical structure 113 to be used to analyze the input data. Alternatively, or in addition, a user provides information about one or more features that are to be included in one or more partitions in the hierarchical structure 113. The hierarchical structure 113 can be curated by one or more experts and can be based on information that is to be gleaned from industry data, which can include information such as industry best practices, configurations for identified use-case and user information, relationships between attributes and/or features, and the like. The hierarchical structure 113 can be received and stored as a data structure used to store a tree structure. The hierarchical structure 113 identifies how to divide the input data into partitions, which include sets of features and can create associations between the partitions.

In some embodiments, the hierarchical structure 113 is a data structure constructed using a set of attributes. For example, based on the type of input data 120 that is going to be analyzed by the system, the features in the hierarchical structure 113 can include demographic, financial, and/or transactional set of features. Features are a set of closely related or associated parameters derived from a data set. In some examples, the hierarchical structure 113 can, for example, be a tree structure, where each level of the tree structure can include one or more partitions. Each partition can include a set of features belonging to the same data source and/or owning similar properties. Different levels of the hierarchical structure 113 are represented as a set of partitions of data at a different level of granularity. For example, as depicted in FIGS. 4 and 5, higher levels in the tree are broader classifications of data while the lower levels of the tree are of a finer granularity of data. Thus, the highest node depicted in FIGS. 4 and 5, represents the union of all the available features from a data set.

Referring to the flowchart in FIG. 11, at step 1004, the method 1000 includes receiving input data 120 to be analyzed by using one or more predictive models 116. In some examples, at least one of the predictive models 116 executed by the predictive module 315 can be an MLP model.

At step 1006, one or more of the systems described herein partitions the input data into group of features according to the hierarchical structure 113. The systems described herein can perform step 1006 in any suitable manner.

In some examples, the input data 120 is decomposed into mutually exclusive sets of features using the hierarchical structure 113. The input data partitioning is based on the feature group defined at each given level of the hierarchical structure 113. The system 100 also iteratively decomposes the input data 120 into the designated number of levels of the hierarchical structure 113.

At step 1008, a predicted score and contextual rationale for each partition is determined. The systems described herein can perform step 1008 in any suitable manner. For example, the interpretability model 335 generates a respective predicted score and contextual rationale for each partition of features from the input data 120. The predicted scores and corresponding contextual rationale can augment the input data 120 to provide contextual information to increase the interpretability of the prediction result 130. By applying the hierarchical structure 113 to the input data 120 while processing the input data 120 using interpretability model 335, the input data 120 can be organized, and augmented so that a user is able to identify a specific level within the results and obtain not only the accurate results as generated by the predictive models 116 in the input data 120 but also the contextual data that explains how the features in the input data 120 interact with each other, what factors influenced the prediction result 130, and providing additional data, such as a predicted score and explanation for the specified partition of features.

At step 1010, each partition is decomposed into sub-partitions of features. The systems described herein can perform step 1010 in any suitable manner. For example, the interpretability model 335 decomposes the partitions into sub-partitions of features based on the feature group defined at a given layer of the hierarchical structure 113.

At step 1012, a score is computed for each sub-partition and partition in the hierarchical structure 113. The systems described herein can perform step 1012 in any suitable manner. For example, the interpretability model 335 generates a respective predicted score or value and contextual rationale for each sub-partition of features from a parent partition. The interpretability model 335 can go back to step 1010 and iteratively decompose the sub-partitions further into sub-partitions of features based on the hierarchical structure 113 until features cannot be partitioned any further.

In some examples, the system 100 identifies a recommended action based on the predicted score or value for a selected partition and/or the input data 120 and facilitates execution of the action based on user input. For example, if the predicted score or value indicates that a patient qualifies for a medical trial for a particular diagnosis, the system can present a notification to a user of the system that the patient qualifies for the trial and a suggested action, such as generating an electronic correspondence, such as an email, to the patient outlining the specific type of medical treatment available through the medical trial. If the user selects to proceed with the action, the system can generate and transmit the electronic correspondence to the patient.

Embodiments of the present invention facilitate a system and apparatus to provide an interpretability to one or more predictive models using a decomposable hierarchical structure. Embodiments of the present invention can facilitate the interaction between industry knowledge worker and data scientist to create a model that has, or can identify the interpretability of the results of a predictive model. Embodiments of the present invention further identify and create a hierarchical structure, with the proper assignment and partitions of the features in an expert model, which is created by experts. Embodiments of the present invention enable an interaction process to add/remove/update key factors (feature or group features) from the hierarchical structure. Embodiments of the present invention further facilitate creating the predictive model as an initial model including all the features that are to be used for generating the expert model with hierarchical structure. Embodiments of the present invention further facilitate generating an interpretable model using the outcome from a parent expert outcome as target and using this local level of experts' features to create the interpretability of the outcome. Embodiments of the present invention facilitate outputting the predicted scores for a selected factor at chosen granularity level. Further, embodiments of the present invention facilitate to group the predicted scores into an action, to enable trigger business action at different granularity levels.

The disclosed embodiments of the present invention facilitate to provide an interpretability model based on the contribution of features or a feature partition to the score and value of an outcome. There is a decomposable hierarchical structure of features as the partitions of features defined by domain experts. A predictive model is generated for each layer of the hierarchical structure of features using an attention neural network using the same training data. A predicted score or value is provided for each partition of the partitions of features using an attention neural network model. Each partition of the partitions of features is decomposed into sub-partitions using the hierarchical structure. A new predicted score or value is provided for each sub-partition of the sub-partitions using another attention neural network model. With the iteration over the decomposable hierarchical structure, and applying the attention model, the contribution of each partition of features at different granularity is identified. The contribution of the interaction of feature partition is identified through the comparison of scores of a partition and its sub-partition.

Figure 12:
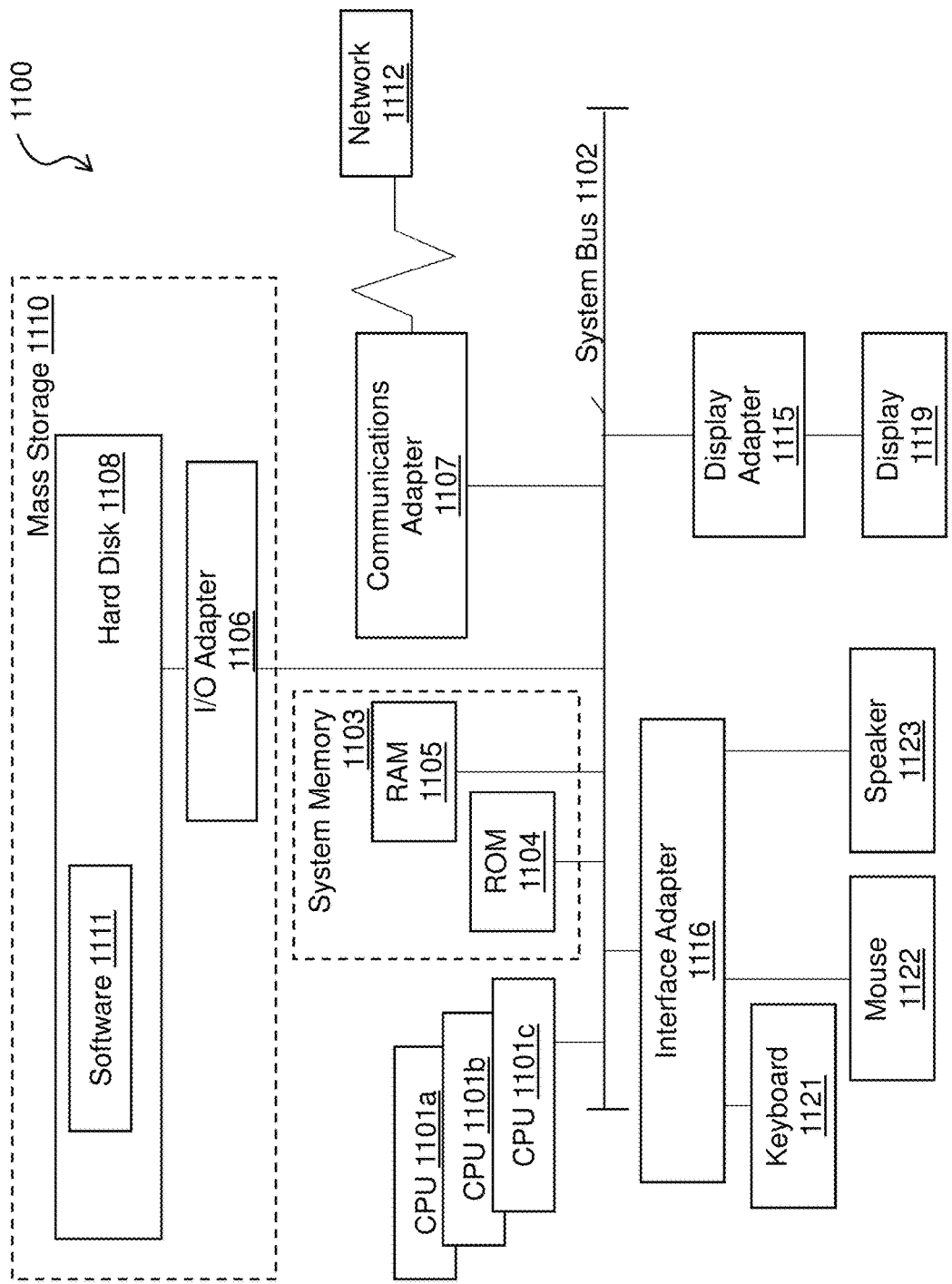
FIG. 12 depicts a block diagram of a processing system for providing interpretability for predictive models using decomposable hierarchical structures according to one or more embodiments of the invention.

Turning now to FIG. 12, a computer system 1100 is generally shown in accordance with an embodiment of the present invention. The computer system 1100 can be an electronic, computer framework comprising and/or employing any number and combination of computing devices and networks utilizing various communication technologies, as described herein. The computer system 1100 can be easily scalable, extensible, and modular, with the ability to change to different services or reconfigure some features independently of others. The computer system 1100 may be, for example, a server, desktop computer, laptop computer, tablet computer, or smartphone. In some examples, computer system 1100 may be a cloud computing node. Computer system 1100 may be described in the general context of computer system executable instructions, such as program modules, being executed by a computer system. Generally, program modules may include routines, programs, objects, components, logic, data structures, and so on that perform particular tasks or implement particular abstract data types. Computer system 1100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, the computer system 1100 has one or more central processing units (CPU(s)) 1101*a*, 1101*b*, 1101*c*, etc. (collectively or generically referred to as processor(s) 1101). The processors 1101 can be a single-core processor, multi-core processor, computing cluster, or any number of other configurations. The processors 1101, also referred to as processing circuits, are coupled via a system bus 1102 to a system memory 1103 and various other components. The system memory 1103 can include a read only memory (ROM) 1104 and a random-access memory (RAM) 1105. The ROM 1104 is coupled to the system bus 1102 and may include a basic input/output system (BIOS), which controls certain basic functions of the computer system 1100. The RAM is read-write memory coupled to the system bus 1102 for use by the processors 1101. The system memory 1103 provides temporary memory space for operations of said instructions during operation. The system memory 1103 can include random access memory (RAM), read only memory, flash memory, or any other suitable memory systems.

The computer system 1100 comprises an input/output (I/O) adapter 1106 and a communications adapter 1107 coupled to the system bus 1102. The I/O adapter 1106 may be a small computer system interface (SCSI) adapter that communicates with a hard disk 1108 and/or any other similar component. The I/O adapter 1106 and the hard disk 1108 are collectively referred to herein as a mass storage 1110.

Software 1111 for execution on the computer system 1100 may be stored in the mass storage 1110. The mass storage 1110 is an example of a tangible storage medium readable by the processors 1101, where the software 1111 is stored as instructions for execution by the processors 1101 to cause the computer system 1100 to operate, such as is described herein below with respect to the various Figures. Examples of computer program product and the execution of such instruction is discussed herein in more detail. The communications adapter 1107 interconnects the system bus 1102 with a network 1112, which may be an outside network, enabling the computer system 1100 to communicate with other such systems. In one embodiment, a portion of the system memory 1103 and the mass storage 1110 collectively store an operating system, which may be any appropriate operating system, such as the z/OS or AIX operating system from IBM Corporation, to coordinate the functions of the various components shown in FIG. 12.

Additional input/output devices are shown as connected to the system bus 1102 via a display adapter 1115 and an interface adapter 1116 and. In one embodiment, the adapters 1106, 1107, 1115, and 1116 may be connected to one or more I/O buses that are connected to the system bus 1102 via an intermediate bus bridge (not shown). A display 1119 (e.g., a screen or a display monitor) is connected to the system bus 1102 by a display adapter 1115, which may include a graphics controller to improve the performance of graphics intensive applications and a video controller. A keyboard 1121, a mouse 1122, a speaker 1123, etc. can be interconnected to the system bus 1102 via the interface adapter 1116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 12, the computer system 1100 includes processing capability in the form of the processors 1101, and, storage capability including the system memory 1103 and the mass storage 1110, input means such as the keyboard 1121 and the mouse 1122, and output capability including the speaker 1123 and the display 1119.

In some embodiments, the communications adapter 1107 can transmit data using any suitable interface or protocol, such as the internet small computer system interface, among others. The network 1112 may be a cellular network, a radio network, a wide area network (WAN), a local area network (LAN), or the Internet, among others. An external computing device may connect to the computer system 1100 through the network 1112. In some examples, an external computing device may be an external webserver or a cloud computing node.

It is to be understood that the block diagram of FIG. 12 is not intended to indicate that the computer system 1100 is to include all of the components shown in FIG. 12. Rather, the computer system 1100 can include any appropriate fewer or additional components not illustrated in FIG. 12 (e.g., additional memory components, embedded controllers, modules, additional network interfaces, etc.). Further, the embodiments described herein with respect to computer system 1100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

What is claimed is:

1. A computer-implemented method for providing interpretable predictions from a machine learning model for determining whether a patient qualifies for a medial trial for a particular diagnosis, the method comprising:
    receiving, by a processor of a computing device, a data structure that represents a hierarchical structure of a set of features (X) of that is used by one or more predictive models to generate a set of predictions (Y); and
    building, by the processor, an interpretability model corresponding to the predictive models, by assigning an interpretability to each prediction $Y_i$ of the predictive model based on the hierarchical structure, wherein assigning the interpretability comprises:
        decomposing, by the processor, the set of features (X) of the input data into a plurality of partitions $X_j$ using the hierarchical structure, wherein $X = U_1^N X_j$, N being the number of partitions;
        decomposing, by the processor, each partition from the partitions into a plurality of sub-partitions using the hierarchical structure until atomic sub-partitions are obtained; and
        computing, by the processor, a score for each partition as a function of the predicted scores of the sub-partitions of said each partition, wherein the predicted scores represent interactions between the sub-partitions; and
        outputting, by the processor, an interpretation of a prediction provided by the predictive model based on the interpretability model, wherein the interpretation represents a weightage of the one or more features used by the predictive model to generate the prediction, wherein:
the method further comprises identifying, by the processor, a recommended action based on the predicted score for a selected feature,
the predicted score for the selected feature indicates that a patient qualifies for a medical trial for a particular diagnosis, and
the recommended action comprises:
    presenting a notification to a user that the patient qualifies for the medial trial; and
    upon a selection to proceed by the user, generating an email outlining a specific type of medical treatment available through the medical trial.

2. The computer-implemented method of claim 1, wherein the partitions of features are mutually exclusive subsets of the input data.

3. The computer-implemented method of claim 1 further comprising generating an overall score for the input data based on the predicted score for each partition.

4. The computer-implemented method of claim 1, wherein generating the hierarchical structure further comprises:
    receiving, by the processor, industry data that is curated by one or more experts; and
    generating, by the processor, the hierarchical structure using the industry data by constructing a tree model by parsing the industry data into the partitions of features and creating associations between the partitions.

5. The computer-implemented method of claim 1, wherein each partition is associated with a corresponding interpretability model.

6. The computer-implemented method of claim 1, wherein the interpretability model is an attention model.

7. A system comprising:
    at least one memory storing computer-executable instructions; and
    at least one processor configured to access the at least one memory and perform a method for providing interpretable predictions from a machine learning model for determining whether a patient qualifies for a medial trial for a particular diagnosis, the method comprising:
        receiving, by a processor of a computing device, a data structure that represents a hierarchical structure of a set of features (X) used by one or more predictive models to generate a set of predictions (Y); and
        building, by the processor, an interpretability model corresponding to the predictive models, by assigning an interpretability to each prediction $Y_i$ of the predictive model based on the hierarchical structure, wherein assigning the interpretability comprises:
            decomposing, by the processor, the set of features (X) of the input data into a plurality of partitions $X_j$ using the hierarchical structure, wherein $X=U_1^N X_j$, N being the number of partitions;

decomposing, by the processor, each partition from the partitions into a plurality of sub-partitions using the hierarchical structure until atomic sub-partitions are obtained; and computing, by the processor, a score for each partition as a function of the predicted scores of the sub-partitions of said each partition, wherein the predicted scores represent interactions between the sub-partitions; and outputting, by the processor, an interpretation of a prediction provided by the predictive model based on the interpretability model, wherein the interpretation represents a weightage of the one or more features used by the predictive model to generate the prediction, wherein:

the method further comprises identifying, by the processor, a recommended action based on the predicted score for a selected feature, the predicted score for the selected feature indicates that a patient qualifies for a medical trial for a particular diagnosis, and the recommended action comprises:
presenting a notification to a user that the patient qualifies for the medial trial; and
upon a selection to proceed by the user, generating an email outlining a specific type of medical treatment available through the medical trial.

8. The system of claim 7, wherein the partitions of features are mutually exclusive subsets of the input data.

9. The system of claim 7, wherein the method further comprises generating an overall score for the input data based on the predicted score for each partition.

10. The system of claim 7, wherein generating the hierarchical structure further comprises:
receiving industry data that is curated by one or more experts; and
generating the hierarchical structure using the industry data by constructing a tree model by parsing the industry data into the partitions of features and creating associations between the partitions.

11. The system of claim 7, wherein each partition is associated with a corresponding interpretability model.

12. The system of claim 7, wherein the interpretability model is an attention model.

13. A computer program product comprising a computer readable storage medium having program instructions embodied therewith, the program instructions executable by one or more processors to cause the one or more processors to perform a method for providing interpretable predictions from a machine learning model for determining whether a patient qualifies for a medial trial for a particular diagnosis comprising:
receiving, by a processor of a computing device, a data structure that represents a hierarchical structure of a set of features (X) used by one or more predictive models to generate a set of predictions (Y);

building, by the processor, an interpretability model corresponding to the predictive models, by assigning an interpretability to each prediction $Y_i$ of the predictive model based on the hierarchical structure, wherein assigning the interpretability comprises:

decomposing, by the processor, the set of features (X) of the input data into a plurality of partitions $X_j$, using the hierarchical structure, wherein $X=U_1^N X_j$, N being the number of partitions;

decomposing, by the processor, each partition from the partitions into a plurality of sub-partitions using the hierarchical structure until atomic sub-partitions are obtained; and computing, by the processor, a score for each partition as a function of the predicted scores of the sub-partitions of said each partition, wherein the predicted scores represent interactions between the sub-partitions; and outputting, by the processor, an interpretation of a prediction provided by the predictive model based on the interpretability model, wherein the interpretation represents a weightage of the one or more features used by the predictive model to generate the prediction, wherein:

the method further comprises identifying, by the processor, a recommended action based on the predicted score for a selected feature, the predicted score for the selected feature indicates that a patient qualifies for a medical trial for a particular diagnosis, and the recommended action comprises:
presenting a notification to a user that the patient qualifies for the medial trial; and
upon a selection to proceed by the user, generating an email outlining a specific type of medical treatment available through the medical trial.

14. The computer program product of claim 13, wherein the partitions of features are mutually exclusive subsets of the input data.

15. The computer program product of claim 13, wherein the method further comprises generating an overall score for the input data based on the predicted score for each partition.

16. The computer program product of claim 13, wherein generating the hierarchical structure further comprises:
receiving industry data that is curated by one or more experts; and
generating the hierarchical structure using the industry data by constructing a tree model by parsing the industry data into the partitions of features and creating associations between the partitions.

17. The computer program product of claim 13, wherein each partition is associated with a corresponding interpretability model.

18. The computer program product of claim 13, wherein the interpretability model is an attention model.

\* \* \* \* \*